UNITED STATES PATENT OFFICE.

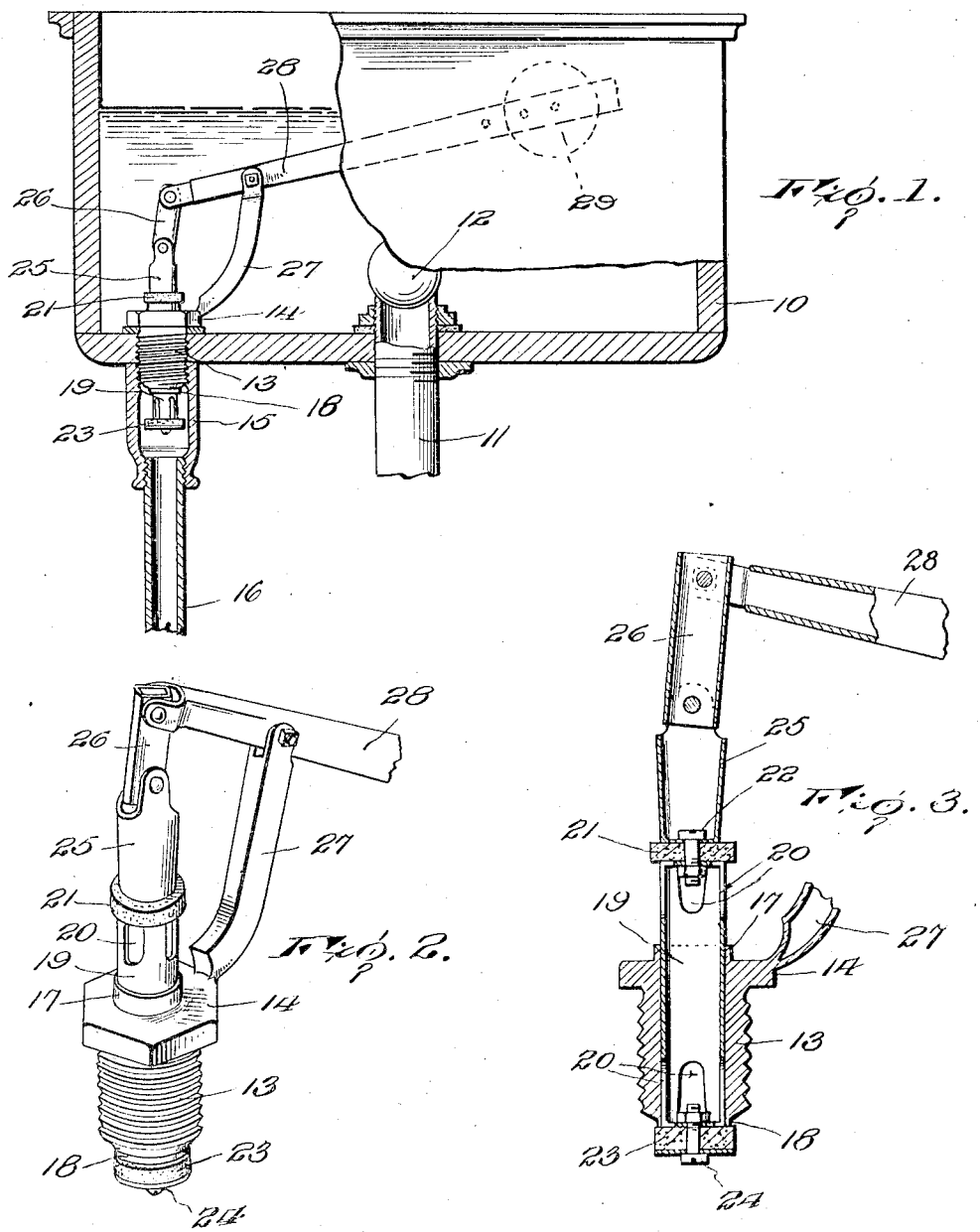

BENJAMIN F. HARDT, OF SAN SABA, TEXAS.

FLUSH-TANK VALVE.

1,359,593.         Specification of Letters Patent.        Patented Nov. 23, 1920.

Application filed May 15, 1919. Serial No. 297,183.

*To all whom it may concern:*

Be it known that I, BENJAMIN F. HARDT, citizen of the United States, residing at San Saba, in the county of San Saba and State of Texas, have invented certain new and useful Improvements in Flush-Tank Valves, of which the following is a specification.

This invention relates to an improved float operated inlet valve for flush tanks and has as one of its principal objects to provide a valve so constructed that should the float of the valve become inoperative by being filled with water, or dropping off, the valve will be immediately closed so as to prevent waste of water through the flush box.

The invention has as a further object to provide a valve employing a valve stem having a valve member at each end thereof and wherein depression of the stem by the elevation of the float will, under normal conditions, serve to close the valve while, when the float is disabled, elevation of the stem will also serve to close the valve.

And the invention has as a still further object to provide a valve which may be readily installed upon substantially any conventional type of flush tank.

Other and incidental objects will appear hereinafter. In the drawings,

Figure 1 is a fragmentary sectional view showing my improved valve in connection with a conventional type of flush tank, Fig. 2 is a perspective view showing the valve in detail, and Fig. 3 is a fragmentary sectional view more particularly illustrating structural details of the valve.

In order that the construction, operation and mounting of my improved valve may be accurately understood I have, in the drawings, shown my improved valve in connection with a conventional type of flush tank 10. This tank is provided with the usual outlet pipe 11 normally closed by a buoyant valve 12 and in this connection it may be observed that, in accordance with ordinary practice, the pipe upstands somewhat within the tank. Coming now more particularly to the subject of the present invention, I employ a valve casing or plug 13 which is fitted through the bottom wall of the tank and, adjacent its upper end, is provided with a wrench receiving flange 14 seating against a suitable gasket within the tank. Threaded upon the lower end of the plug is a coupling sleeve 15 adjustable for tightly binding the flange against said gasket to provide a sealed joint between the plug and the bottom wall of the tank. A suitable supply pipe, as conventionally illustrated at 16, may be connected to the sleeve 15. At its upper end the plug is formed with a valve seat 17 while a valve seat 18 is also formed at the lower end of the plug. Slidable through the plug and fitting snugly therein is a tubular valve stem 19 provided adjacent each end thereof with a series of openings 20. Seated against the upper end of this stem is a valve member or disk 21 secured to the stem by a bolt or other suitable fastening device 22 engaged through the upper end wall of the stem. The valve member 21 is adapted to coöperate with the valve seat 17. Seated against the lower end of the stem is a valve member or disk 23 secured to the stem by a bolt or other suitable fastening device 24 engaging through the lower end wall of the stem and preferably a suitable washer is, as particularly shown in Fig. 3, arranged between the head of the bolt and the lower face of the valve member. The valve member 23 is adapted to coöperate with the valve seat 18. The valve members or disks 21 and 23 respectively may be formed of leather, rubber, or any other approved material. Seating at its lower end against the valve member 21 is a hollow cylindrical head 25 secured to the stem by the fastening device 22 which engages through the lower end wall of the head. At its upper end, the head is provided with spaced ears between which is pivoted the lower end of a hollow link 26. In this connection, it may be observed that the valve stem, the head therefor, and the link, are all preferably formed of suitable sheet metal. Upstanding from the plug 13 at one side thereof, is a longitudinally curved bracket 27 provided at its upper end with spaced ears between which is pivoted, adjacent its inner end, a hollow arm 28. This arm is, at its inner end, provided with spaced ears to which is pivotally connected the upper end of the link 26. The bracket 27 and arm 28 may also be formed of suitable sheet metal. However, it is to be noted that the arm is gradualy enlarged toward its free end and the free end portion of this arm is of a weight sufficient to elevate the valve stem. An approved float, as shown in dotted lines at 29 in Fig. 1, may be connected in any suitable manner to the free end of the arm.

As will now be readily understood, water in the tank 10 will, when the tank is filled as shown in Fig. 1, elevate the float to depress the valve stem 19 and hold the float so elevated to accordingly maintain the valve member 21 against the valve seat 17. The inlet valve will accordingly be closed to shut off the flow of water into the tank. Upon the opening of the outlet valve 12, the water level in the tank will, of course, fall to lower the float so that the valve stem 19 will be elevated and the valve member 21 accordingly moved away from its seat. Thus, the inlet valve will be opened to permit a flow of water into the tank. Since the outlet pipe 11 upstands a short distance within the tank, a residue of water will, under normal conditions, always remain in the tank. Accordingly, when the valve 12 is opened, this residue of water will sustain the float so as to prevent movement of the valve member 23 to engage the valve seat 18. However, should the float become filled with water or displaced, it will be seen that the free end of the arm 28 will immediately swing downwardly within the tank and shift the valve member 23 into engagement with its seat 18 for closing the inlet valve. Consequently, under these conditions, the valve will operate automatically to cut off inlet flow into the tank and accordingly prevent waste of the water through the tank. I accordingly provide an efficient and highly meritorious type of valve and a valve which may, as will now be appreciated, be readily used in connection with substantially any conventional type of flush tank.

Having thus described the invention, what is claimed as new is:

1. A device of the class described including a valve casing provided at opposite ends with valve seats, a hollow valve stem slidably and snugly fitting through the casing and having openings, a valve member carried by the upper end of the stem to coöperate with one of said seats, a second valve member carried by the lower end of the stem to coöperate with the other of said seats, and a float operated arm connected with the stem, and being of a weight at its free end portion sufficient to overbalance the stem and said valve members whereby the arm will engage said lower valve member with the adjacent valve seat in the event of the float becoming inoperative.

2. A device of the class described including a vertically disposed valve casing provided at opposite ends with valve seats, a hollow valve stem of a greater length than said casing and snugly fitting through the casing and slidable therein, said stem being provided adjacent its ends with passages, a lower valve member carried by one end of the stem adapted to coact with one of said seats, a second valve member carried by the opposite end of the stem and adapted to coact with the other of said seats, a bracket extending from the casing, and a float operated arm pivoted adjacent its inner end upon said bracket and operatively connected with the stem, the outer end portion of the arm overbalancing the stem and said valve members whereby the arm will engage said lower valve member with the adjacent valve seat in the event of the float becoming inoperative.

3. The combination with a flush tank having an outlet pipe upstanding therein to provide a residue of water in the tank when the tank is emptied, of an inlet valve for the tank including a valve casing, a valve slidable within the casing and having means for engaging and closing either end of the same, and a float operated arm pivoted within the tank, the outer end portion of the arm being of a weight sufficient to overbalance said slidable valve whereby the float and arm will be actuated by the rise and fall of water within the tank and will be sustained by said residue of water to prevent the closing of the valve when the tank is empty but wherein the arm will when freed from the float close the valve.

4. A flush tank valve including a casing having seats at its upper and lower ends, a tubular valve member snugly and slidably fitted within said casing and being of a greater length than the same, upper and lower disk valves carried by said tubular member and adapted to engage said seats, the end portions of said tubular member being provided with inlet and outlet openings to permit of the flow of water through the casing and the tubular member, a bracket carried by said casing, a float operated arm pivoted adjacent its inner end to said bracket, a head secured to said tubular member, and a link connected to said head and the inner end of said arm, the free end portion of said arm being of a weight sufficient to engage said lower disk valve with a lower valve seat of the casing in the event of the float carried by the arm becoming inoperative.

In testimony whereof I affix my signature.

BENJAIN F. HARDT. [L. S.]